US012643589B2

(12) United States Patent
Llorens

(10) Patent No.: US 12,643,589 B2
(45) Date of Patent: Jun. 2, 2026

(54) BABY STROLLER HANDLE DEVICE

(71) Applicant: Simone Llorens, Glendale, CA (US)

(72) Inventor: Simone Llorens, Glendale, CA (US)

( * ) Notice: Subject to any disclaimer, the term of this patent is extended or adjusted under 35 U.S.C. 154(b) by 291 days.

(21) Appl. No.: 18/601,782

(22) Filed: Mar. 11, 2024

(65) Prior Publication Data

US 2025/0282408 A1 Sep. 11, 2025

(51) Int. Cl.
*B62B 9/20* (2006.01)
*B62B 9/12* (2006.01)

(52) U.S. Cl.
CPC . *B62B 9/20* (2013.01); *B62B 9/12* (2013.01)

(58) Field of Classification Search
CPC .............. B62B 9/12; B62B 9/20; B62B 9/206
See application file for complete search history.

(56) References Cited

U.S. PATENT DOCUMENTS

| | | | | |
|---|---|---|---|---|
| 6,059,301 A | | 5/2000 | Skarnulis | |
| 6,070,889 A | | 6/2000 | Handberry | |
| 6,098,492 A | * | 8/2000 | Juchniewicz | B62B 9/20 74/555 |
| 6,439,521 B1 | * | 8/2002 | Wilson | B62B 9/00 248/228.7 |
| 6,722,689 B2 | * | 4/2004 | Kreamer | B62B 9/20 280/47.38 |
| 10,654,507 B2 | * | 5/2020 | Perilli | B62B 5/067 |
| 11,097,762 B1 | * | 8/2021 | Collins | B62B 5/064 |
| 11,447,169 B2 | * | 9/2022 | Sklenar | B62B 9/20 |
| D966,156 S | | 10/2022 | Perilli | |
| 11,820,418 B1 | * | 11/2023 | Jackson | B62B 7/042 |
| 11,878,730 B1 | * | 1/2024 | Musshorn | A63B 23/12 |
| 12,179,828 B2 | * | 12/2024 | Leinbach | B62B 9/26 |
| 2005/0062243 A1 | | 3/2005 | Austin | |
| 2005/0246861 A1 | * | 11/2005 | Monrad | B62B 9/20 16/110.1 |
| 2007/0126195 A1 | * | 6/2007 | Dresher | B62B 9/20 280/47.38 |
| 2007/0210560 A1 | * | 9/2007 | Groover | B62B 9/24 280/642 |
| 2014/0008883 A1 | * | 1/2014 | Litman | A63B 23/1209 280/47.38 |
| 2015/0069738 A1 | * | 3/2015 | Knight | A63B 21/4035 280/47.38 |
| 2016/0311456 A1 | | 10/2016 | Schuman | |
| 2021/0188340 A1 | * | 6/2021 | Dalton | B62B 5/068 |

(Continued)

FOREIGN PATENT DOCUMENTS

WO WO2020143767 7/2020

*Primary Examiner* — Jeffrey J Restifo

(57) ABSTRACT

A baby stroller handle device includes a baby stroller that has a frame which including a handle that angles upwardly and rearwardly from the baby stroller. A pair of first handle extensions is each slidably integrated into the handle of the frame. Each of the pair of first handle extensions is urgeable into a deployed position such that a respective one of the pair of first handle extensions can be gripped by the caregiver thereby facilitating the caregiver to stand off to either side of the baby stroller. A pair of second handle extensions is each pivotally attached to the handle. Each of the pair of second handle extensions is pivotable into a deployed position such that a respective one of the pair of second handle extensions can be gripped by the caregiver thereby facilitating the caregiver to stand next to the baby stroller.

12 Claims, 8 Drawing Sheets

(56)          References Cited

U.S. PATENT DOCUMENTS

| | | |
|---|---|---|
| 2023/0023661 A1 | 1/2023 | Leinbach |
| 2023/0372774 A1* | 11/2023 | Pomante ................. A63B 23/12 |
| 2025/0282408 A1* | 9/2025 | Llorens .................... B62B 9/20 |
| 2025/0376209 A1* | 12/2025 | Remole Druin ........ B62B 9/206 |

* cited by examiner

BABY STROLLER HANDLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to baby stroller devices and more particularly pertains to a new baby stroller device for facilitating a caregiver to stand on either side of a baby stroller while the caregiver is pushing the baby stroller. The device includes a pair of first handle extensions that are each slidably integrated into a handle of a baby stroller thereby facilitating a caregiver to stand on either side of the baby stroller while the caregiver is pushing the baby stroller. The device includes a pair of second handle extensions that are each pivotally attached to the handle thereby facilitating the caregiver to stand along side the baby stroller when the caregiver is pushing the baby stroller.

(2) Description of Related Art Including Information Disclosed Under 37 CFR 1.97 and 1.98

The prior art relates to baby stroller devices including a variety of baby stroller devices that each at least includes a handle that is pivotable forwardly on a baby stroller to facilitate a caregiver to stand in front of a baby stroller while the caregiver is pushing the baby stroller and a baby stroller device that includes a second handle that is pivotally attached to a frame of a baby stroller to facilitate a caregiver to stand alongside the baby stroller while the caregiver is pushing the baby stroller. In no instance does the prior art disclose a baby stroller device that includes a pair of first handle extensions that are each slidably integrated into a handle of a baby stroller which can each be deployed to extend laterally away from the handle and a pair of second handle extensions that are each pivotally attached to the handle which can each be deployed to extend laterally away from the handle.

BRIEF SUMMARY OF THE INVENTION

An embodiment of the disclosure meets the needs presented above by generally comprising a baby stroller that has a frame which including a handle that angles upwardly and rearwardly from the baby stroller. A pair of first handle extensions is each slidably integrated into the handle of the frame. Each of the pair of first handle extensions is urgeable into a deployed position such that a respective one of the pair of first handle extensions can be gripped by the caregiver thereby facilitating the caregiver to stand off to either side of the baby stroller. A pair of second handle extensions is each pivotally attached to the handle. Each of the pair of second handle extensions is pivotable into a deployed position such that a respective one of the pair of second handle extensions can be gripped by the caregiver thereby facilitating the caregiver to stand next to the baby stroller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
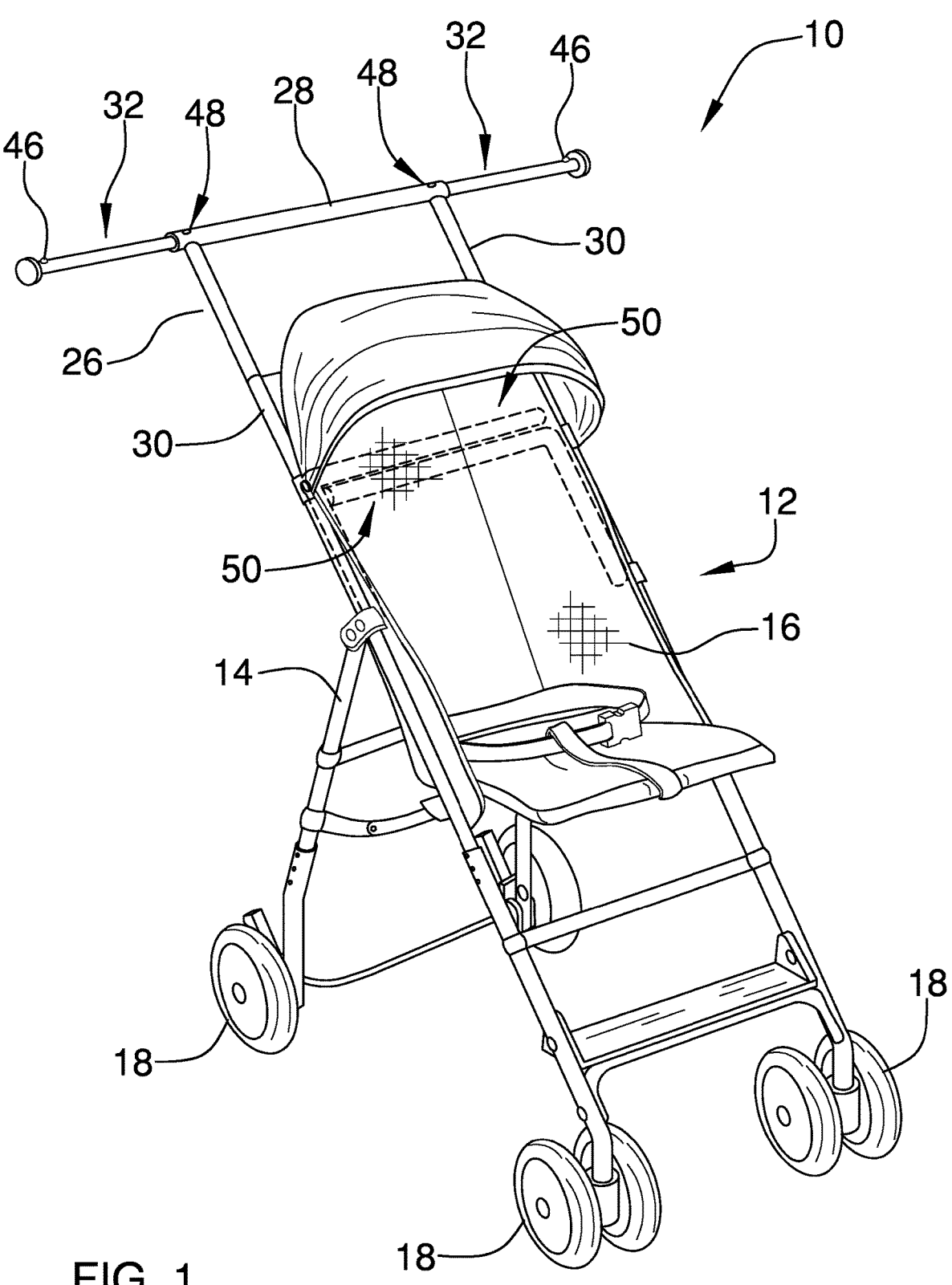
FIG. 1 is a front perspective view of a baby stroller handle device according to an embodiment of the disclosure showing a pair of first handle extensions each in a deployed position.
Figure 2:
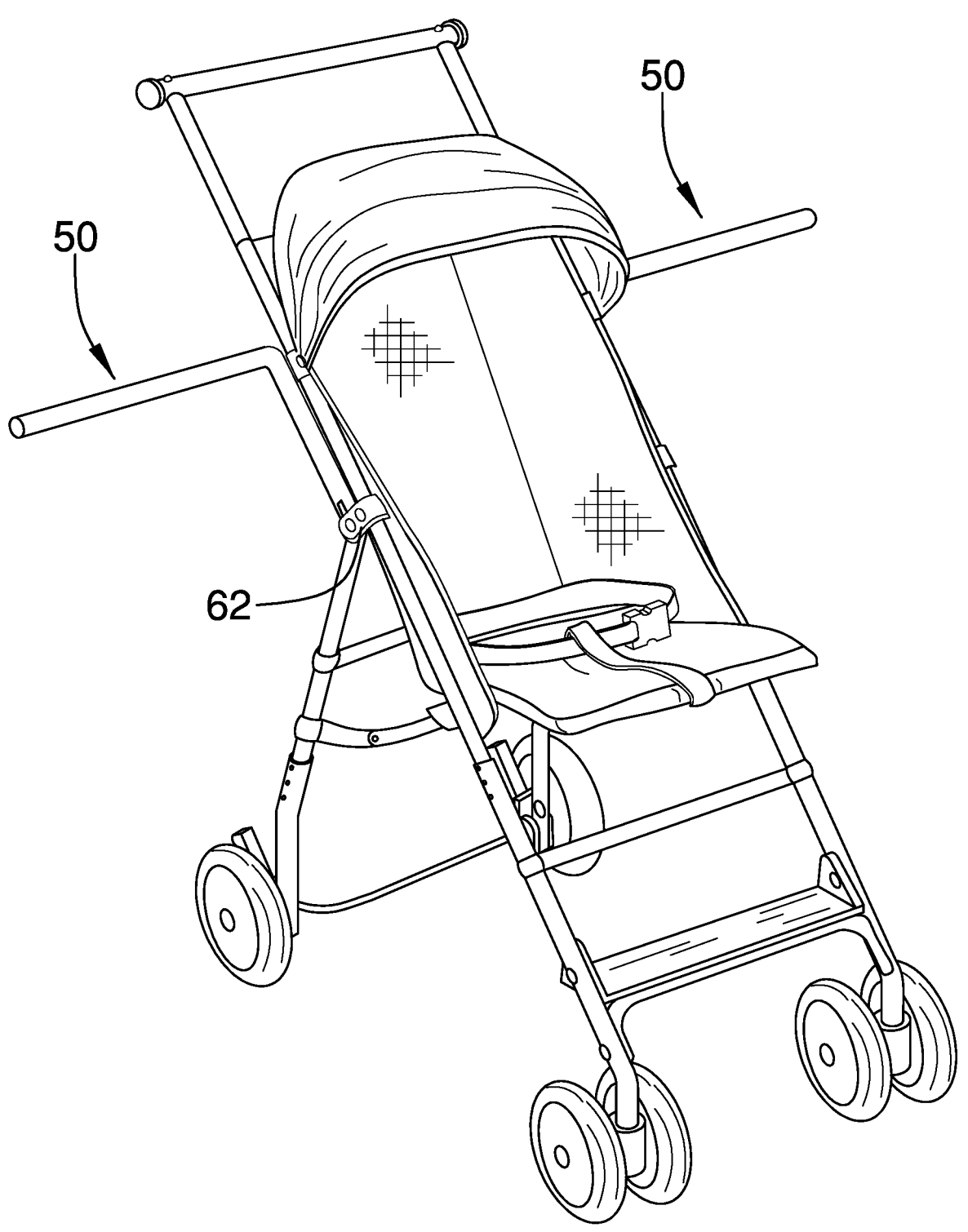
FIG. 2 is a front perspective view of an embodiment of the disclosure showing a pair of second handle extensions each in a deployed position.
Figure 3:
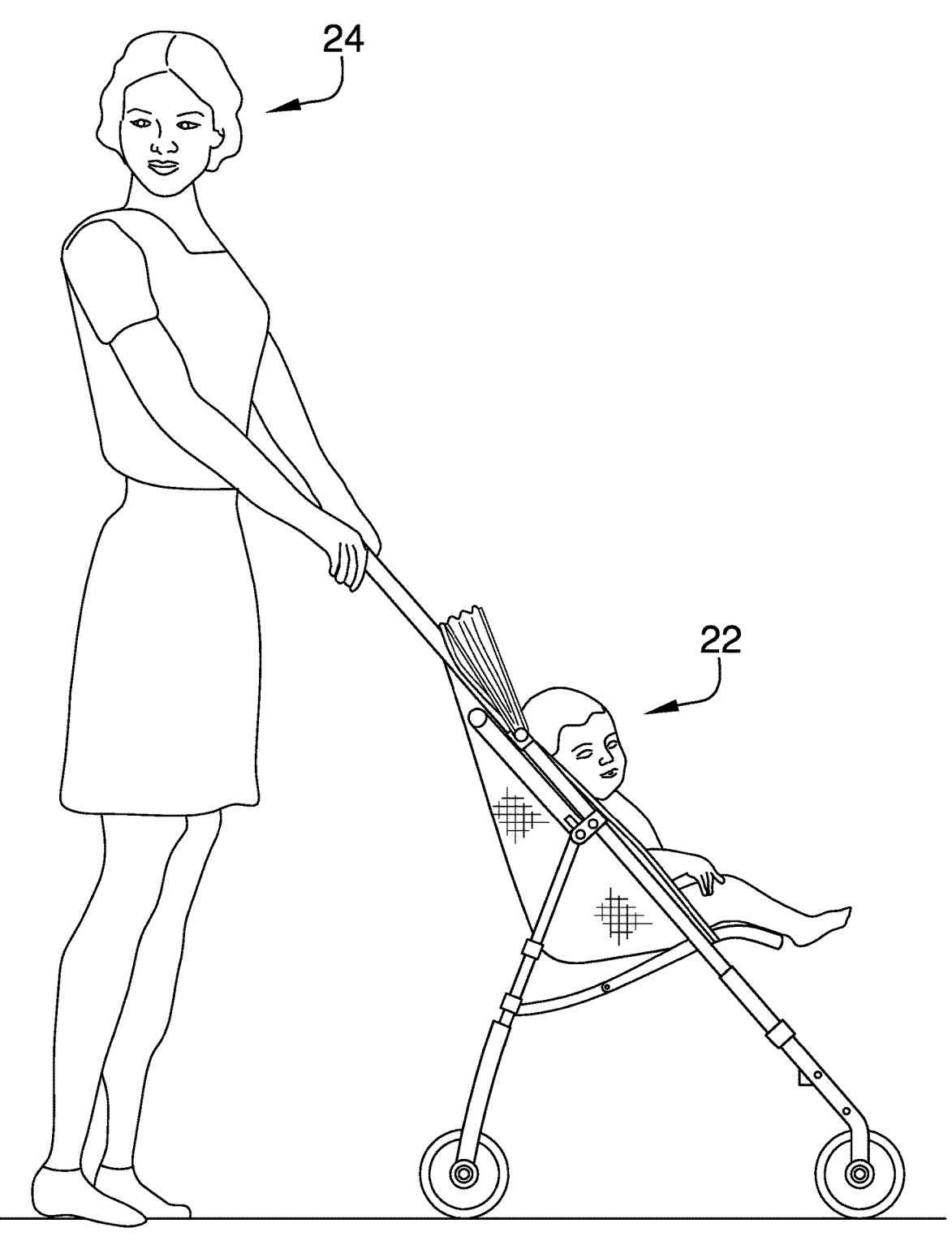
FIG. 3 is a right side in-use view of an embodiment of the disclosure.
Figure 4:
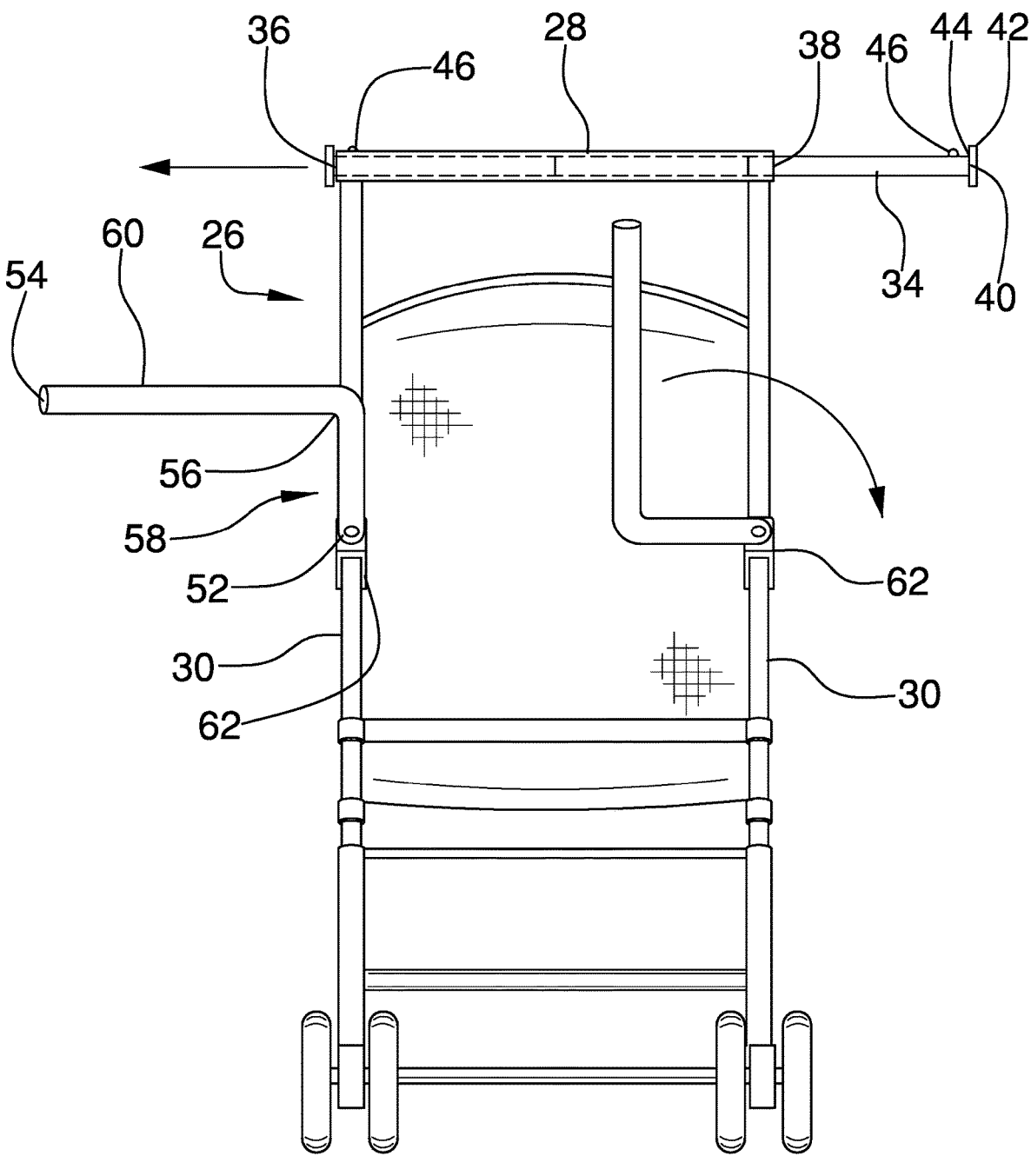
FIG. 4 is a back view of an embodiment of the disclosure.
Figure 5:
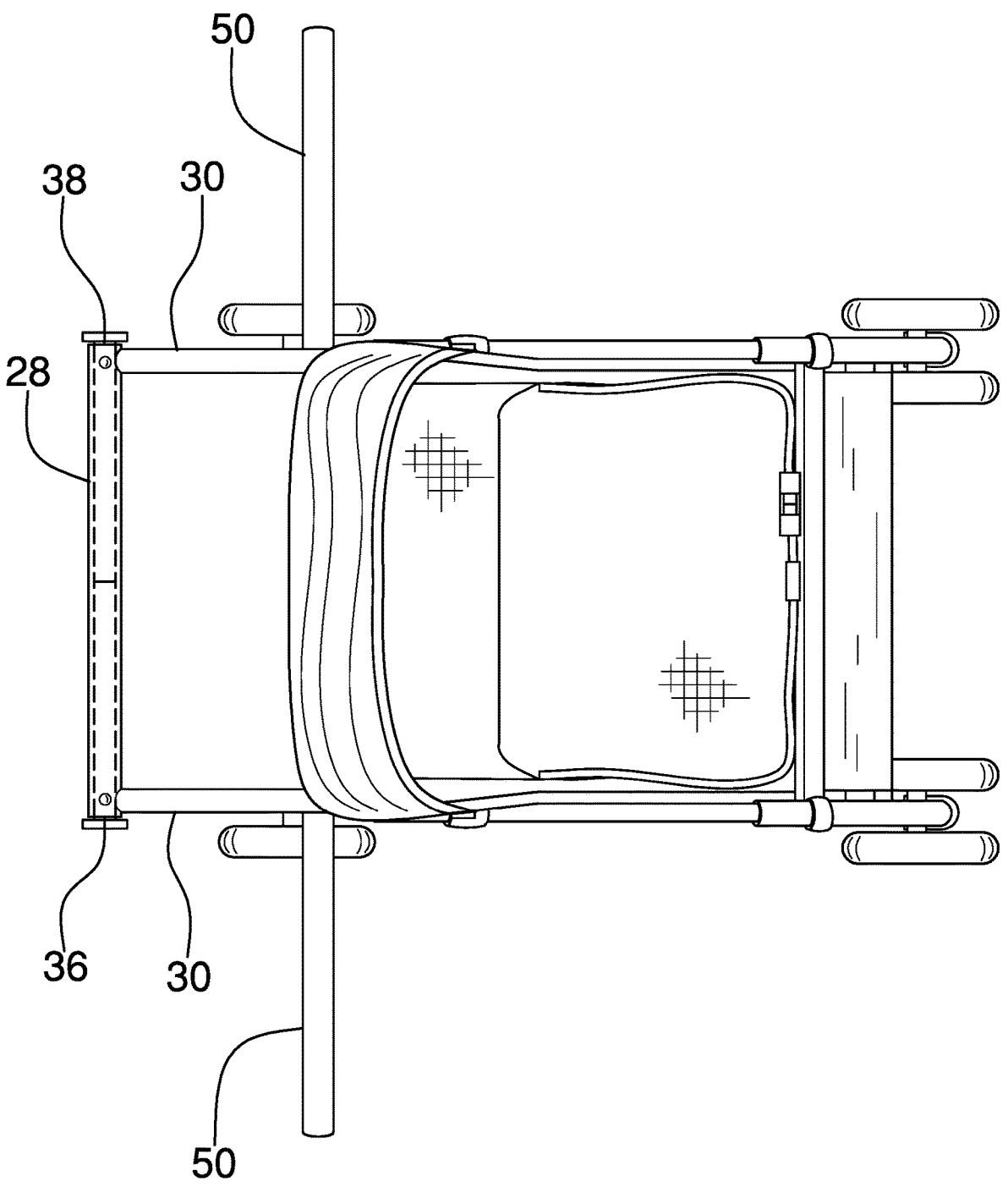
FIG. 5 is a top phantom view of an embodiment of the disclosure.

With reference now to the drawings, and in particular to FIGS. 1 through 8 thereof, a new baby stroller device embodying the principles and concepts of an embodiment of the disclosure and generally designated by the reference numeral 10 will be described.

As best illustrated in FIGS. 1 through 8, the baby stroller handle device 10 generally comprises a baby stroller 12 that has a frame 14 and a seat 16 attached to the frame 14 and a plurality of rollers 18 each rotatably disposed on the frame 14 to roll along a support surface 20 thereby facilitating a baby 22 seated in the seat 16 to be transported by a caregiver 24. The frame 14 includes a handle 26 which angles upwardly and rearwardly from the seat 16 such that the handle 26 can be gripped by the caregiver 24 for pushing the baby stroller 12. The handle 26 including a central tube 28 extending between and being perpendicular to a pair of sidelong members 30 such that the central tube 28 can be gripped by the caregiver 24.

A pair of first handle extensions 32 is provided and each of the pair of first handle extensions 32 is slidably integrated into the handle 26 of the frame 14. Each of the pair of first handle extensions 32 is urgeable into a deployed position having each of the pair of first handle extensions 32 extending in opposite directions from the handle 26 with respect to each other. In this way a respective one of the pair of first handle extensions 32 can be gripped by the caregiver 24 thereby facilitating the caregiver 24 to stand off to either side of the baby stroller 12 when the caregiver 24 is pushing the baby stroller 12. Thus, the caregiver 24 can more effectively see potential hazards that the caregiver 24 might not be able to see were the caregiver 24 positioned behind the baby stroller 12 while the caregiver 24 is pushing the baby stroller 12. Each of the pair of first handle extensions 32 is positionable in a stored position having each of the pair of first handle extensions 32 being contained within the handle 26.

Each of the pair of first handle extensions 32 comprises a cylinder 34 which extends into the central tube 28 of the frame 14. The cylinder 34 associated with each of the pair of first handle extensions 32 extends into a respective one of a first end 36 of the central tube 28 and a second end 38 of the central tube 28. Additionally, the cylinder 34 has an exposed end 40 with respect to the central tube 28. Each of the pair of first handle extensions 32 includes a disk 42 that has a coupled surface 44 which is coupled to the exposed end 40 of the cylinder 34. The disk 42 associated with each of the pair of first handle extensions 32 rests against a respective one of the first end 36 or the second end 38 of the central tube 28 when the cylinder 34 is contained in the central tube 28. Furthermore, the disk 42 has an outside diameter that is greater than an outside diameter of the cylinder 34 thereby inhibiting the cylinder 34 from being fully inserted into the central tube 28.

Each of the pair of first handle extensions 32 includes a lock 46 that is movably integrated into the cylinder 34. The lock 46 is biased to extend outwardly through a hole 48 in the central tube 28 when the cylinder 34 is contained in the central tube 28 thereby inhibiting the cylinder 34 from being slid outwardly from the central tube 28. Furthermore, the lock 46 is urgeable downwardly thereby facilitating the cylinder 34 to be slid outwardly from the central tube 28. In this way the cylinder 34 can be gripped by the caregiver 24 thereby facilitating the caregiver 24 to push the baby stroller 12. The lock 46 may comprise a ball and a biasing member positioned within the cylinder 34 that biases the ball to extend outwardly from the cylinder 34.

A pair of second handle extensions 50 is provided and each of the pair of second handle extensions 50 is pivotally attached to the handle 26. Each of the pair of second handle extensions 50 is positioned closer to the seat 16 than the pair of first handle extensions 32. Additionally, each of the pair of second handle extensions 50 is pivotable into a deployed position having each of the pair of second handle extensions 50 extending laterally away from the handle 26. In this way a respective one of the pair of second handle extensions 50 can be gripped by the caregiver 24 thereby facilitating the caregiver 24 to stand next to the baby stroller 12 while the caregiver 24 is pushing the baby stroller 12.

Each of the pair of second handle extensions 50 has a primary end 52 and a secondary end 54 and a bend 56 that is located between the primary end 52 and the secondary end 54 to define a primary portion 58 of the second handle extensions 50 that is perpendicular to a secondary portion 60 of the second handle extensions 50. The primary end 52 is associated with the primary portion 58 and the secondary end 54 is associated with the secondary portion 60. The secondary end 54 of each of the pair of second handle extensions 50 is pivotally attached to a respective one of a pair of knuckles 62 each disposed on a respective one of the pair of sidelong members 30 of the handle 26.

Each of the pair of second handle extensions 50 is positionable in a stored position having the secondary portion 60 being horizontally oriented behind the seat 16 and having the primary portion 58 being vertically oriented behind the seat 16. Conversely, each of the pair of second handle extensions 50 is positionable in a deployed position having the secondary portion 60 being vertically oriented and being aligned with the respective sidelong member 30 of the handle 26 and having the primary portion 58 being horizontally oriented and extending laterally away from the respective sidelong member 30. In this way the primary portion 58 of a respective one of the pair of second handle extensions 50 can be gripped by the caregiver 24 thereby facilitating the caregiver 24 to push the baby stroller 12.

Figure 6:
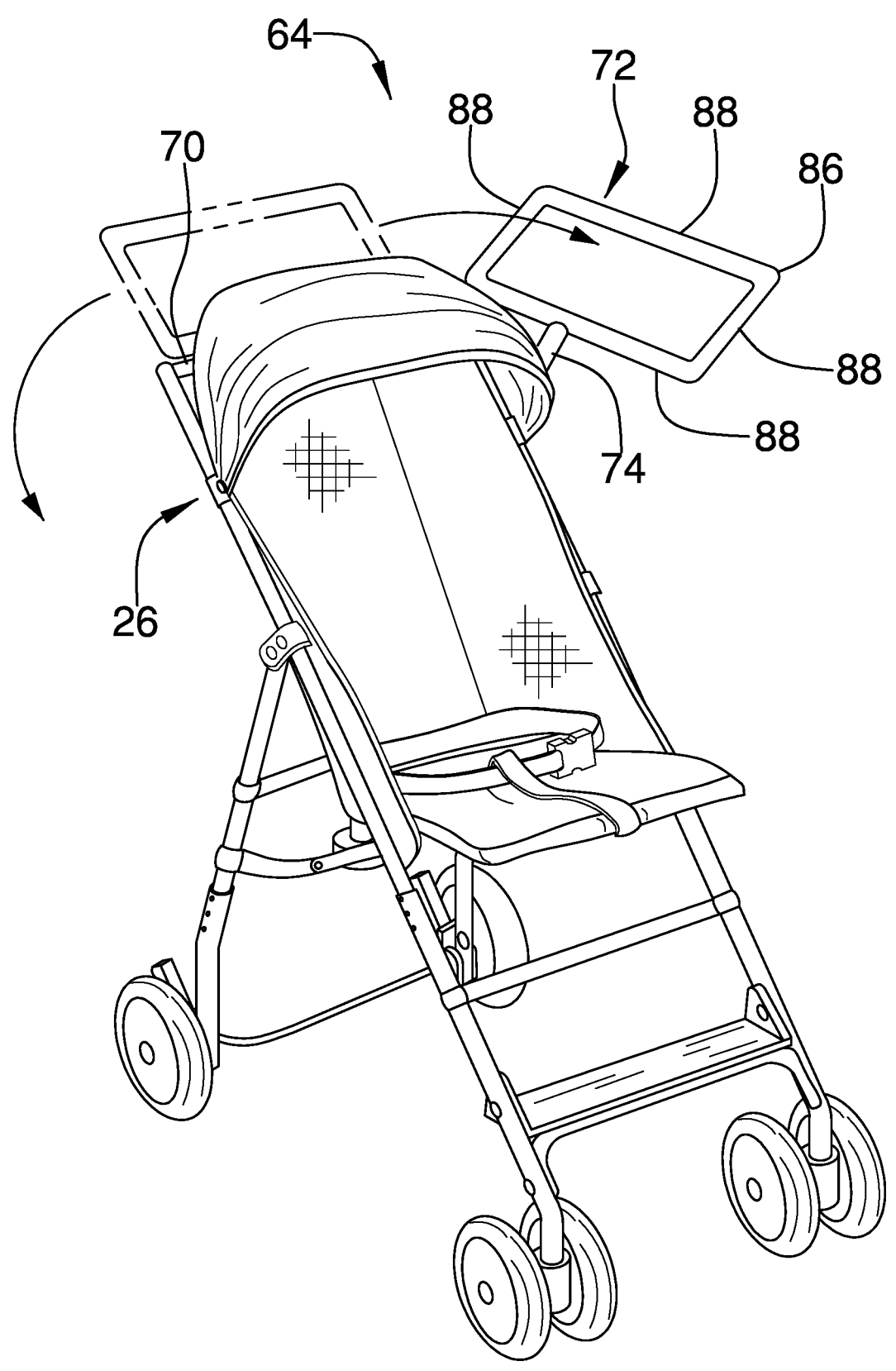
FIG. 6 is a front perspective view of an alternative embodiment of the disclosure.
Figure 7:
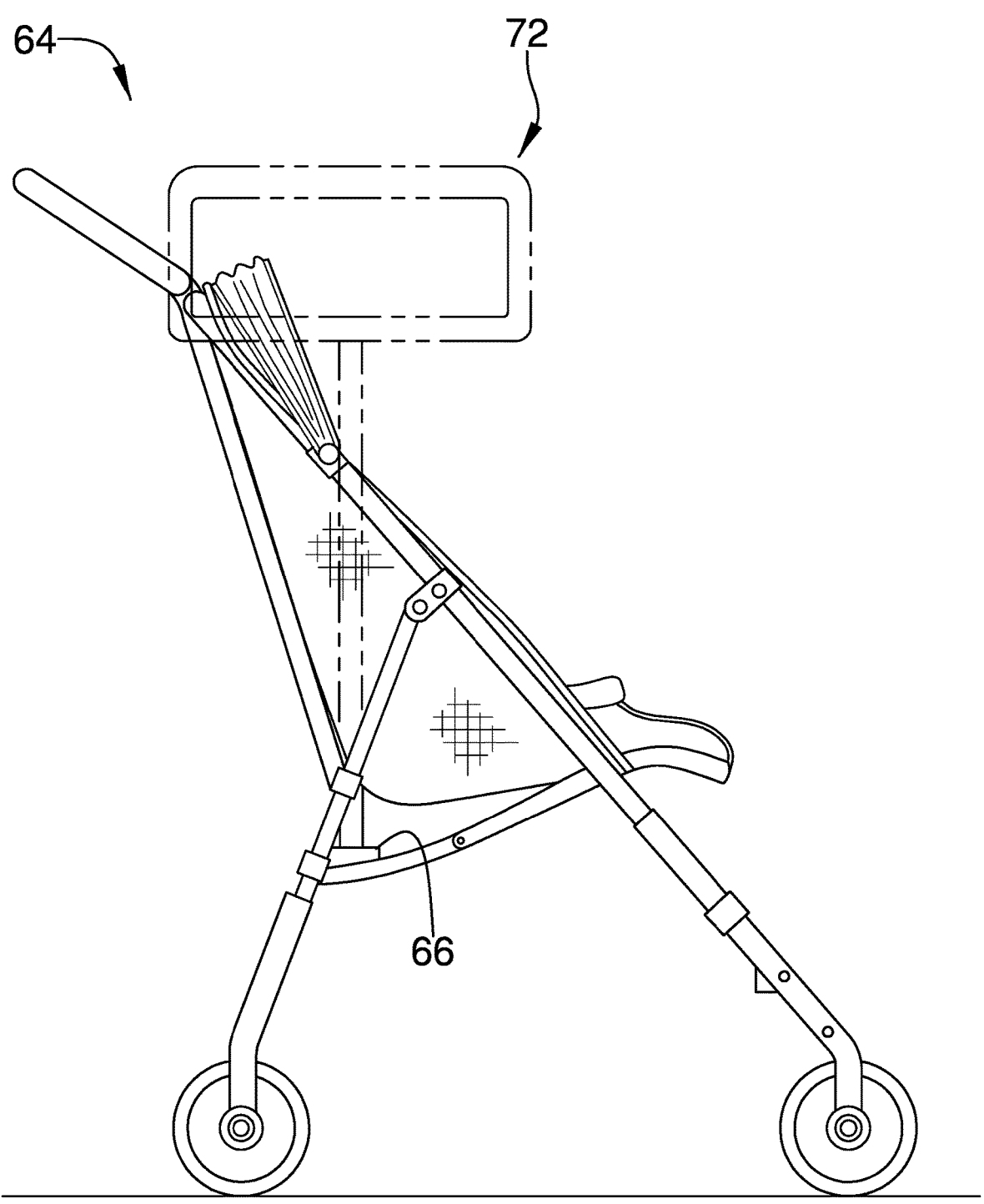
FIG. 7 is a right side view of an alternative embodiment of the disclosure.
Figure 8:
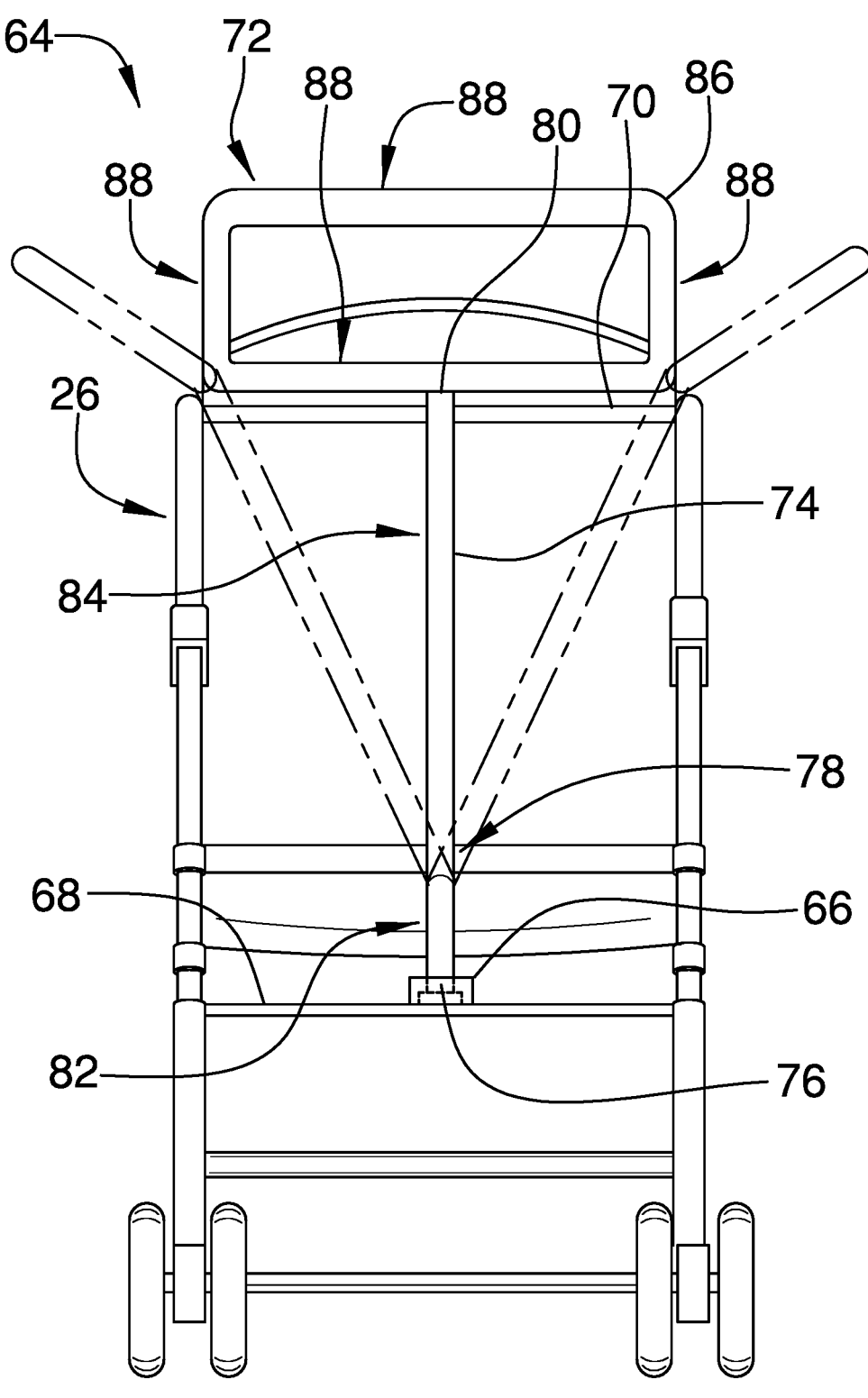
FIG. 8 is a back view of an alternative embodiment of the disclosure.

In an alternative embodiment 64 shown in FIGS. 6 through 8, a pivot 66 is attached to a cross member 68 of the frame 14 of the baby stroller 12 and the pivot 66 is centrally located along the cross member 68. Continuing in the alternative embodiment 64, the handle 26 of the frame 14 of the baby stroller 12 includes a horizontal member 70 extending between the pair of sidelong members 30. The alternative embodiment 64 includes a pivoting handle 72 that has a member 74 which has a lower end 76 that is pivotally attached to the pivot 66 such that the member 74 extends upwardly toward the horizontal member 70 of the handle 26 of the frame 14. The member 74 of the pivoting handle 72 has a bend 78 that is located closer to the lower end 76 than an upper end 80 of the member 74 of the pivoting handle 72 thereby defining a lower portion 82 of member 74 of the pivoting handle 72 forming an angle with an upper portion 84 of the member 74 of the pivoting handle 72. The lower portion 82 is associated with the lower end 76 and the upper portion 84 is associated with the upper end 80.

Continuing in the alternative embodiment 64, the pivoting handle 72 includes a grip 86 which comprises a plurality of intersecting members 88 such that the grip 86 has a rectangular shape. The upper end 80 of the member 74 of the pivoting handle 72 is attached to a respective one of the plurality of intersecting members 88. In this way the grip 86 can be gripped by the caregiver 24 thereby facilitating the caregiver 24 to push the baby stroller 12. The pivoting handle 72 is pivotable in a first direction on the pivot 66 having the pivoting handle 72 extending laterally in either direction away from the handle 26 of the frame 14. In this way the grip 86 of the pivoting handle 72 facilitates the caregiver 24 to stand on either side of the baby stroller 12 when the caregiver 24 is pushing the baby stroller 12. Furthermore, the pivoting handle 72 is pivotable in a second direction on the pivot 66 having the member 74 of the pivoting handle 72 rotating about a lengthwise axis of the lower portion 82 of the member 74. In this way the grip 86 can be oriented at a preferred angle for the caregiver 24 to enhance comfort for the caregiver 24 when the caregiver 24 is gripping the grip 86.

In use, either of the first handle extensions 32 is urged into the deployed position to facilitate the caregiver 24 to stand on either side of the baby stroller 12 while the caregiver 24 is pushing the baby stroller 12. In this way the caregiver 24 can clearly see hazards, such as an obstacle or a hole for example, that the caregiver 24 might otherwise not see if the caregiver 24 were standing behind the baby stroller 12. Either of the second handle extensions 50 can be positioned in the deployed position to facilitate the caregiver 24 to stand alongside the baby stroller 12 while the caregiver 24 is pushing the baby stroller 12. Additionally, a pair of the caregivers 24, such as a mother and a father for example, can each grip 86 a respective one of the first handle extensions 32 or the second handle extensions 50 to facilitate each of the pair of caregivers 24 to push the baby stroller 12. As is shown in the alternative embodiment 64, the pivoting handle 72 can be pivoted to either side of the baby stroller 12 and the pivoting handle 72 can be rotated about the member 74 to orient the grip 86 at a preferred orientation to enhance comfort for the caregiver 24.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A baby stroller handle device for facilitating a caregiver to be standing beside a baby stroller while the caregiver is pushing said baby stroller, said device comprising:

a baby stroller having a frame and a seat attached to said frame and a plurality of rollers each being rotatably disposed on said frame wherein said plurality of rollers is configured to roll along a support surface thereby facilitating a baby seated in said seat to be transported by a caregiver, said frame including a handle which angles upwardly and rearwardly from said seat wherein said handle is configured to be gripped by the caregiver for pushing said baby stroller;

a pair of first handle extensions, each of said pair of first handle extensions being slidably integrated into said handle of said frame, each of said pair of first handle extensions being urgeable into a deployed position having each of said pair of first handle extensions extending in opposite directions from said handle with respect to each other wherein a respective one of said pair of first handle extensions is configured to be gripped by the caregiver thereby facilitating the caregiver to stand off to either side of said baby stroller when the caregiver is pushing said baby stroller, each of said pair of first handle extensions being positionable in a stored position having each of said pair of first handle extensions being contained within said handle; and a pair of second handle extensions, each of said pair of second handle extensions being pivotally attached to said handle, each of said pair of second handle extensions being positioned closer to said seat than said pair of first handle extensions, each of said pair of second handle extensions being pivotable into a deployed position having each of said pair of second handle extensions extending laterally away from said handle wherein a respective one of said pair of second handle extensions is configured to be gripped by the caregiver thereby facilitating the caregiver to stand next to said baby stroller while the caregiver is pushing said baby stroller.

2. The device according to claim 1, wherein:

said handle includes a central tube extending between and being perpendicular to a pair of sidelong members wherein said central tube is configured to be gripped by the caregiver; and each of said pair of first handle extensions comprises:

a cylinder extending into said central tube of said frame, said cylinder associated with each of said pair of first handle extensions extending into a respective one of a first end of said central tube and a second end of said central tube, said cylinder having an exposed end with respect to said central tube; and a disk having a coupled surface being coupled to said exposed end of said cylinder, said disk associated with each of said pair of first handle extensions resting against a respective one of said first end or said second end of said central tube when said cylinder is contained in said central tube, said disk having an outside diameter being greater than an outside diameter of said cylinder.

3. The device according to claim 2, wherein:

each of said pair of first handle extensions includes a lock being movably integrated into said cylinder;

said lock is biased to extend outwardly through a hole in said central tube when said cylinder is contained in said central tube thereby inhibiting said cylinder from being slid outwardly from said central tube; and said lock is urgeable downwardly thereby facilitating said cylinder to be slid outwardly from said central tube wherein said cylinder is configured to be gripped by the caregiver thereby facilitating the caregiver to push said baby stroller.

4. The device according to claim 1, wherein:

each of said pair of second handle extensions has a primary end and a secondary end and a bend being located between said primary end and said secondary end to define a primary portion of said second handle extensions being perpendicular to a secondary portion of said second handle extensions;

said primary end is associated with said primary portion;

said secondary end is associated with said secondary portion; and said secondary end of each of said pair of second handle extensions is pivotally attached to a respective one of a pair of knuckles each disposed on a respective one of said pair of sidelong members of said handle.

5. The device according to claim 4, wherein each of said pair of second handle extensions is positionable in a stored position having said secondary portion being horizontally oriented behind said seat and having said primary portion being vertically oriented behind said seat.

6. The device according to claim 4, wherein each of said pair of second handle extensions is positionable in a deployed position having said secondary portion being vertically oriented and being aligned with said respective sidelong member of said handle and having said primary portion being horizontally oriented and extending laterally away from said respective sidelong member wherein said primary portion of a respective one of said pair of second handle extensions is configured to be gripped by the caregiver thereby facilitating the caregiver to push said stroller.

7. A baby stroller handle device for facilitating a caregiver to be standing beside a baby stroller while the caregiver is pushing said baby stroller, said device comprising:

a baby stroller having a frame and a seat attached to said frame and a plurality of rollers each being rotatably disposed on said frame wherein said plurality of rollers is configured to roll along a support surface thereby facilitating a baby seated in said seat to be transported by a caregiver, said frame including a handle which angles upwardly and rearwardly from said seat wherein said handle is configured to be gripped by the caregiver for pushing said baby stroller, said handle including a central tube extending between and being perpendicular to a pair of sidelong members wherein said central tube is configured to be gripped by the caregiver;

a pair of first handle extensions, each of said pair of first handle extensions being slidably integrated into said handle of said frame, each of said pair of first handle extensions being urgeable into a deployed position having each of said pair of first handle extensions extending in opposite directions from said handle with respect to each other wherein a respective one of said pair of first handle extensions is configured to be gripped by the caregiver thereby facilitating the caregiver to stand off to either side of said baby stroller when the caregiver is pushing said baby stroller, each of said pair of first handle extensions being positionable in a stored position having each of said pair of first handle extensions being contained within said handle, each of said pair of first handle extensions comprising:

a cylinder extending into said central tube of said frame, said cylinder associated with each of said pair of first handle extensions extending into a respective one of a first end of said central tube and a second end of said central tube, said cylinder having an exposed end with respect to said central tube;

a disk having a coupled surface being coupled to said exposed end of said cylinder, said disk associated with each of said pair of first handle extensions resting against a respective one of said first end or said second end of said central tube when said cylinder is contained in said central tube, said disk having an outside diameter being greater than an outside diameter of said cylinder; and a lock being movably integrated into said cylinder, said lock being biased to extend outwardly through a hole in said central tube when said cylinder is contained in said central tube thereby inhibiting said cylinder from being slid outwardly from said central tube, said lock being urgeable downwardly thereby facilitating said cylinder to be slid outwardly from said central tube wherein said cylinder is configured to be gripped by the caregiver thereby facilitating the caregiver to push said baby stroller; and a pair of second handle extensions, each of said pair of second handle extensions being pivotally attached to said handle, each of said pair of second handle extensions being positioned closer to said seat than said pair of first handle extensions, each of said pair of second handle extensions being pivotable into a deployed position having each of said pair of second handle extensions extending laterally away from said handle wherein a respective one of said pair of second handle extensions is configured to be gripped by the caregiver thereby facilitating the caregiver to stand next to said baby stroller while the caregiver is pushing said baby stroller, each of said pair of second handle extensions having a primary end and a secondary end and a bend being located between said primary end and said secondary end to define a primary portion of said second handle extensions being perpendicular to a secondary portion of said second handle extensions, said primary end being associated with said primary portion, said secondary end being associated with said secondary portion, said secondary end of each of said pair of second handle extensions being pivotally attached to a respective one of a pair of knuckles each disposed on a respective one of said pair of sidelong members of said handle, each of said pair of second handle extensions being positionable in a stored position having said secondary portion being horizontally oriented behind said seat and having said primary portion being vertically oriented behind said seat, each of said pair of second handle extensions being positionable in a deployed position having said secondary portion being vertically oriented and being aligned with said respective sidelong member of said handle and having said primary portion being horizontally oriented and extending laterally away from said respective sidelong member wherein said primary portion of a respective one of said pair of second handle extensions is configured to be gripped by the caregiver thereby facilitating the caregiver to push said stroller.

8. The device according to claim 7, further comprising a pivot being attached to a cross member of said frame of said baby stroller, said pivot being centrally located along said cross member.

9. The device according to claim 8, wherein:

said handle of said frame of said baby stroller includes a horizontal member extending between said pair of sidelong members;

said device includes a pivoting handle having a member which has a lower end being pivotally attached to said pivot such that said member extends upwardly toward said horizontal member of said handle of said frame; and said member of said pivoting handle having a bend being located closer to said lower end than an upper end of said member of said pivoting handle thereby defining a lower portion of member of said pivoting handle forming an angle with an upper portion of said member of said pivoting handle, said lower portion being associated with said lower end, said upper portion being associated with said upper end.

10. The device according to claim 9, wherein said pivoting handle includes a grip comprising a plurality of intersecting members such that said grip has a rectangular shape, said upper end of said member of said pivoting handle being attached to a respective one of said plurality of intersecting members wherein said grip is configured to be gripped by the caregiver thereby facilitating the caregiver to push said baby stroller.

11. The device according to claim 10, wherein said pivoting handle is pivotable in a first direction on said pivot having said pivoting handle extending laterally in either direction away from said handle of said frame wherein said grip of said pivoting handle is configured to facilitate the caregiver to stand on either side of said baby stroller when the caregiver is pushing said baby stroller.

12. The device according to claim 11, wherein said pivoting handle is pivotable in a second direction on said pivot having said member of said pivoting handle rotating about a lengthwise axis of said lower portion of said member thereby facilitating said grip to be oriented at a preferred angle wherein said pivoting handle is configured to enhance comfort for the caregiver when the caregiver is gripping said grip.

\* \* \* \* \*